(12) United States Patent
Vu et al.

(10) Patent No.: US 8,055,262 B1
(45) Date of Patent: Nov. 8, 2011

(54) DISPATCH NETWORK AND IMS INTEGRATION WITH CENTRALIZED EVENT NOTIFICATION SERVER

(75) Inventors: Trinh D. Vu, Ashburn, VA (US); Ojas Choksi, Herndon, VA (US); Ramesh Kalathur, Fairfax, VA (US); Moshe Stoler, Gaithersburg, MD (US); Hung Bui, Chantilly, VA (US); David Kuan, Vienna, VA (US)

(73) Assignee: Nextel Communications Inc., Reston, VA (US)

( * ) Notice: Subject to any disclaimer, the term of this patent is extended or adjusted under 35 U.S.C. 154(b) by 873 days.

(21) Appl. No.: 11/481,718

(22) Filed: Jul. 5, 2006

Related U.S. Application Data

(60) Provisional application No. 60/695,881, filed on Jul. 5, 2005, provisional application No. 60/695,879, filed on Jul. 5, 2005.

(51) Int. Cl.
*H04W 4/00* (2009.01)
(52) U.S. Cl. .................. 455/435.1; 455/435.2; 455/433; 455/443; 455/444; 455/445; 455/448; 455/518; 455/519; 455/456.1; 455/457
(58) Field of Classification Search .................. 370/260, 370/390; 455/90.2, 435.1, 517–518, 435.2, 455/433, 443, 444, 445, 448
See application file for complete search history.

(56) References Cited

U.S. PATENT DOCUMENTS

| 7,170,863 | B1 * | 1/2007 | Denman et al. | 370/260 |
| 2003/0012177 | A1 * | 1/2003 | Vassilovski | 370/349 |
| 2005/0097363 | A1 * | 5/2005 | Bajko et al. | 713/201 |
| 2006/0087973 | A1 * | 4/2006 | Huang | 370/234 |
| 2006/0121924 | A1 * | 6/2006 | Rengaraju et al. | 455/518 |
| 2006/0153102 | A1 * | 7/2006 | Kuure et al. | 370/263 |
| 2008/0248826 | A1 * | 10/2008 | Holm | 455/518 |

OTHER PUBLICATIONS

3GPP TS 23.228, V6.6.0, (Jun. 2004; IP Multimedia Subsystem (IMS) Stage 2, Release 6.*

* cited by examiner

*Primary Examiner* — Kamran Afshar
*Assistant Examiner* — Khalid Shaheed (57) ABSTRACT

Several embodiments of an IMS communications network are disclosed. In one embodiment, the network comprises a plurality of dispatch application servers (DAS), an S-CSCF, and an event notification server. The S-CSCF is adapted to receive an IMS registration request from a dispatch client, authenticate the registration request, send a registration confirmation to the dispatch client, and send a notification indicating the registration of the dispatch client to an event notification server. The event notification server is adapted to receive the notification from the S-CSCF, select a DAS, and send a notification to the selected DAS indicating an assignment to provide dispatch service to the dispatch client. In another embodiment, the registration notification to the event notification server is sent from the dispatch client, instead of the S-CSCF.

21 Claims, 7 Drawing Sheets

DISPATCH NETWORK AND IMS INTEGRATION WITH CENTRALIZED EVENT NOTIFICATION SERVER

CROSS REFERENCE TO RELATED APPLICATIONS

This application claims the benefit of the filing dates of Provisional Applications, Ser. Nos. 60/695,881 and 60/695,879, both of which were filed on Jul. 5, 2005, and both of which are incorporated herein by reference.

FIELD OF THE INVENTION

The invention relates generally to wireless communications systems and, more particularly, to systems and methods for providing roaming subscribers with access to dispatch application services.

BACKGROUND OF THE INVENTION

Dispatch services, also known as walkie-talkie services, provide near-instant, half-duplex communication between a dispatch caller and one or more target dispatch users. Dispatch services are typically offered as subscription services on wireless communications systems, which may also offer interconnect calling, short message service (SMS), packet data and other communications services to wireless subscribers. Each wireless communications system facilitates communications using one or more multiple-access wireless technologies such as code division multiple access (CDMA), global system for mobile communication (GSM), time division multiple access (TDMA), orthogonal frequency division multiplexing (OFDM), and others. Known dispatch technologies include Nextel's Direct Connect®, Qualcomm's QChat and Push-to-Talk over Cellular (PoC).

Existing dispatch services were optimized to minimize communications latencies to achieve the near-instant communications desired by dispatch subscribers. These high performance dispatch networks typically include a regional dispatch application server that manages dispatch communications for local wireless subscriber units. To initiate and receive dispatch calls in a conventional dispatch network, the wireless subscriber must first register with a regional location server and a dispatch application server servicing the network region. When the wireless subscriber roams to a different region or network, registration with the new network is required to notify the wireless subscriber's home network of its current location, and receive authorization to access local dispatch services.

Various frameworks exist for facilitating the provisioning of multimedia application services to roaming subscribers, including the IP Multimedia Subsystem (IMS) standard. IMS was developed to provide open access to a wide variety of multimedia applications across disparate communications networks and administrative location domains. A wireless subscriber roaming onto an IMS network requires a single registration as an IMS client to access available IMS applications.

Conventional high performance dispatch networks do not support IMS registration for PTT services. Accordingly, a need exists for systems and methods for implementing IMS registration on dispatch networks.

SUMMARY OF THE INVENTION

An aspect of the invention relates to a communications network, comprising a plurality of dispatch application servers (DAS), an S-CSCF device, and an event notification server. The S-CSCF device is adapted to receive an IMS registration or re-registration request from a subscriber unit, authenticate the IMS registration or re-registration request; send an IMS registration or re-registration confirmation to the subscriber unit; and send a notification indicating the IMS registration or re-registration of to event notification server. The event notification server is adapted to receive the notification from the S-CSCF device, select one of the dispatch application services (DAS) based on the information provided in the notification, and send a notification to the selected dispatch application server (DAS) indicating an assignment to provide dispatch services to the subscriber unit.

Another aspect of the invention relates to a communications network, comprising a plurality of dispatch application servers (DAS), an S-CSCF device, and an event notification server. The S-CSCF device is adapted to receive an IMS registration or re-registration request from a subscriber unit; authenticate the IMS registration or re-registration request; and send an IMS registration or re-registration confirmation to the subscriber unit. The event notification server is adapted to receive a notification indicating the IMS registration or re-registration from the subscriber unit; select one of the dispatch application services (DAS) based on the information provided by the notification; and send a notification to the selected dispatch application server (DAS) indicating an assignment to provide dispatch services to the subscriber unit.

Another aspect of the invention relates to an event notification server adapted to interface with an IMS network, comprising a network interface; and a processor adapted to receive a notification of a registration or re-registration of a subscriber unit via the network interface; select a dispatch application server (DAS) from among a plurality of dispatch application servers (DAS) based on the information provided in the notification; and send a notification to the selected dispatch application server (DAS) via the network interface, indicating an assignment to provide dispatch services to the subscriber unit. In one embodiment, the processor receives the registration or re-registration notification from an S-CSCF device. In another embodiment, the processor receives the registration or re-registration notification from the subscriber unit.

Another aspect of the invention relates to an S-CSCF device, comprising a network interface; and a processor adapted to receive an IMS registration or re-registration request from a subscriber unit, authenticate the IMS registration or re-registration request; and send a notification indicating the registration or re-registration of the subscriber unit to an event notification server, wherein said notification comprises address, location, and/or location domain information related to said subscriber unit to said event notification server for the purpose of said event notification server assigning a dispatch application server to provide dispatch services to the subscriber unit.

Another aspect of the invention relates to a subscriber unit, comprising an interface; and a processor controlled by an IMS software module and a dispatch software module; wherein said IMS software module is adapted to receive address, location and/or domain location from said dispatch software module; send an IMS registration or re-registration request including said address, location, and/or domain location information to an IMS network via the interface, and receive an IMS registration or re-registration confirmation from the IMS network via the interface. An S-CSCF device of the IMS network, in turn, sends a registration notification including address, location and/or location domain information associated with the subscriber unit to an event notification server for the purpose of assigning a dispatch application server to provide dispatch services to the subscriber unit.

Another aspect of the invention relates to a subscriber unit, comprising an interface, and a processor adapted to be controlled by an IMS software module and a dispatch software module. The IMS software module is adapted to send a notification to the dispatch software module indicating a registration of the subscriber unit with an IMS network; and the dispatch software module, in response to receiving the registration notification from said IMS software module, sends a notification to an event notification server including information (address, location, and/or location domain) from which said event notification server is to select a dispatch application server to provide dispatch service to a user of said subscriber unit.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
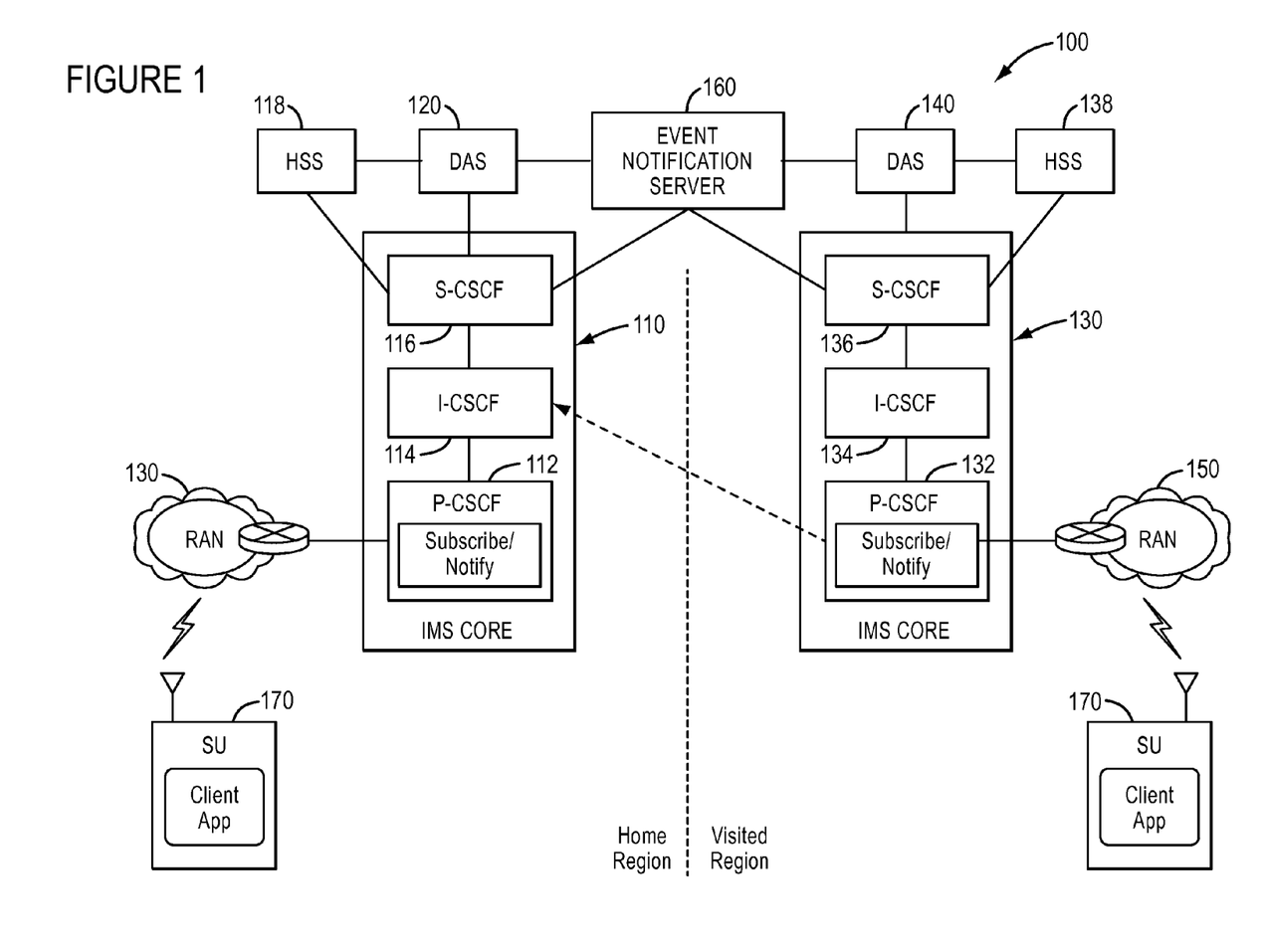
FIG. 1 illustrates a block diagram of an exemplary communication system in accordance with an embodiment of the invention.

FIG. 1 illustrates a block diagram of an exemplary communication system 100 in accordance with an embodiment of the invention. The communication system 100 comprises a first IMS core 110 comprising a proxy call session control function (P-CSCF) device 112 coupled to an interrogating CSCF (I-CSCF) device 114, which, in turn, is coupled to a serving CSCF (S-CSCF) device 116. The S-CSCF device 116, in turn, is coupled to a home subscriber server (HSS) 118 and a dispatch application server (DAS) 120. The P-CSCF device 112, in turn, is coupled to a radio access network (RAN) 130 for communicating via a wireless medium with one or more subscriber units, such as subscriber unit 170.

The communication system 100 further comprises a second IMS core 130 comprising a P-CSCF device 132 coupled to an I-CSCF device 134, which, in turn, is coupled to an S-CSCF device 136. The S-CSCF device 136, in turn, is coupled to an HSS 138 and a dispatch application server (DAS) 140. The P-CSCF 132, in turn, is coupled to a radio access network (RAN) 150 for communicating via a wireless medium with one or more subscriber units, such as subscriber unit 170.

The communication system 100 further comprises an event notification server 160 coupled to both S-CSCF devices 116 and 136 of the first and second IMS cores 110 and 130. The event notification server 160 is further coupled to the dispatch application servers 120 and 140. As discussed in detail below, the event notification server 160 receives information regarding an IMS registration or re-registration of a subscriber unit, determines the appropriate dispatch application server (DAS) to provide services to the subscriber unit, and sends a notification to the dispatch application server (DAS) assigning it to provide services to the subscriber unit.

As a summary of the IMS system, the P-CSCF devices 112 and 132 function as an initial contact point to the IMS system from the perspective of a subscriber unit. As discussed in more detail below, the P-CSCFs 112 and 132 forwards a registration request received from a subscriber unit to the I-CSCF device of the home region of the subscriber unit. The I-CSCF devices 114 and 134 function as an initial contact point to the IMS system at the home region of the subscriber unit. The I-CSCF devices 114 and 134 also select the appropriate S-CSCF device for performing a registration process for the subscriber unit, and forwards the registration request to the selected S-CSCF device. The S-CSCF devices 116 and 136 function to process a registration request including accessing subscriber profile information from the appropriate HSS 118 and 138 to determine whether the subscriber unit is authorized to register with the IMS system.

As alluded to above, the HSS 118 and 138 store subscriber profile information for the purpose of registering a subscriber unit with the IMS system. The dispatch application servers (DAS) 120 and 140 provide dispatch services to authorized subscriber units. Although dispatch services are serving as an example, it shall be understood that other services may be provided to subscriber units, such as full-duplex voice services, messaging services, packet data services, and others. In general, the dispatch application servers (DAS) 120 and 140 can be any type of application server.

The following describes a couple of exemplary methods of how the event notification server 160 receives information about a registration or re-registration event of a subscriber unit, determines an appropriate dispatch application server (DAS) for the subscriber unit based on information associated with the registration or re-registration event, and notifies the selected application server (DAS) of its assignment to provide dispatch services to the subscriber unit. Also following are detailed discussions of an exemplary event notification server, an S-CSCF device, and a subscriber unit, and their respective operations with regard to the notification process provided by the event notification server.

Figure 2:
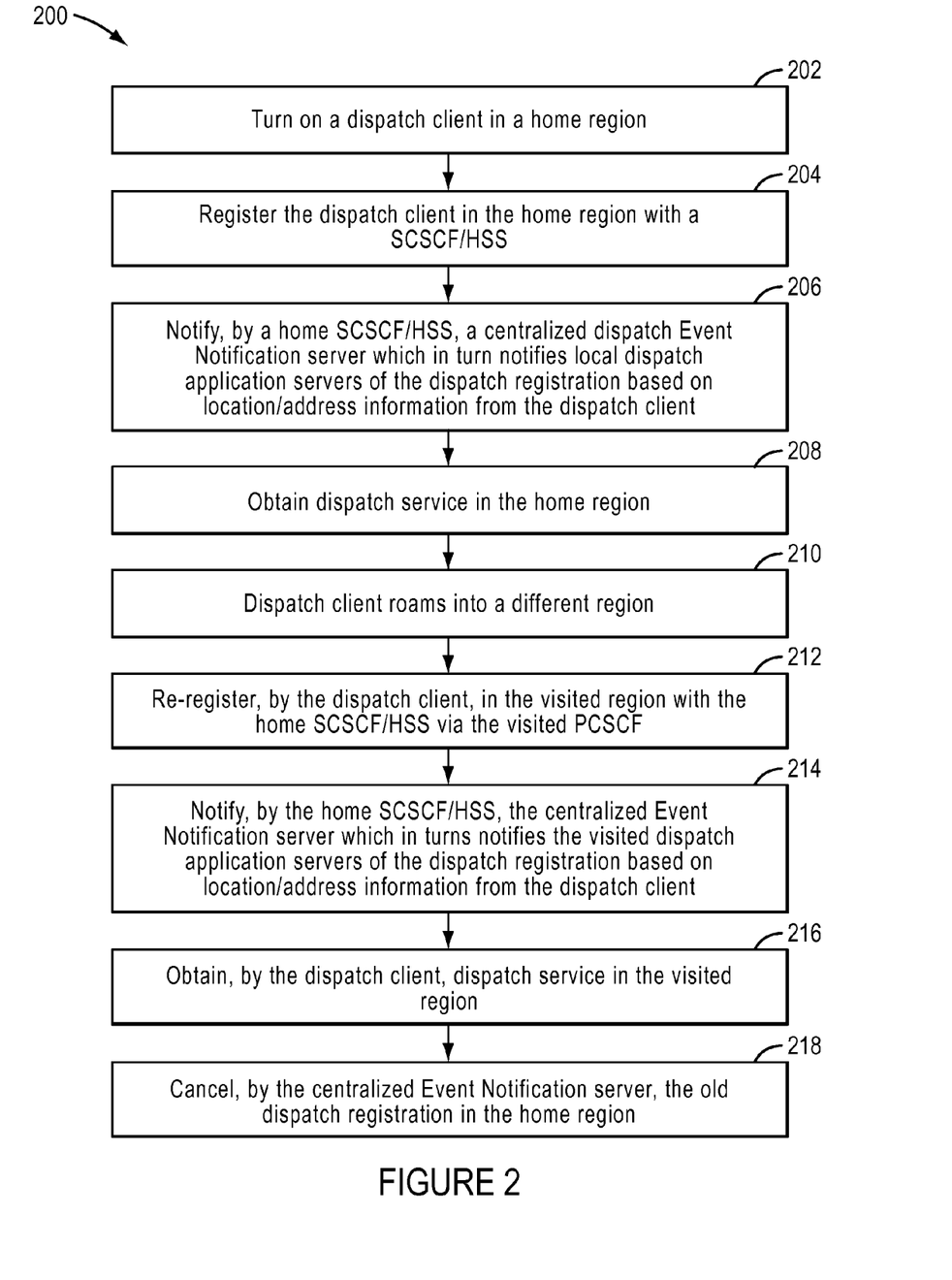
FIG. 2 illustrates an exemplary method of assigning a local dispatch application server for providing services to a subscriber unit in accordance with another embodiment of the invention.

FIG. 2 illustrates an exemplary method 200 of assigning a dispatch application server (DAS) to provide services to a subscriber unit in accordance with another embodiment of the invention. In this example, the user of the subscriber unit 170 is initially in his/her home region, which is serviced by the first IMS core 110. Then, the user of the subscriber unit 170 roams to the visited region, which is serviced by the second IMS core 130.

According to the method 200, the user turns on the subscriber unit 170 in the home region (block 202). In response to being turned on, the subscriber unit 170 sends a registration request to the S-CSCF device 116 via the RAN 130, P-CSCF device 112, and the I-CSCF device 114 (block 204). In response to the registration request, the home S-CSCF 116 accesses subscriber profile information from the HSS 118 to authenticate the client, and if authenticated, sends a notification to the event notification server 160 which, in turn, notifies the dispatch application server (DAS) 120 of the dispatch registration based on the location, address, and location domain information (in this case, the location domain of the home network) of the subscriber unit 170 (block 206). The location domain refers to the regional domain in which the subscriber unit resides. The event notification server 160 looks up the dispatch application server based on the registration information (location, address, and location domain of subscriber unit), and notifies a dispatch application server (DAS) to provide services to the subscriber unit. The dispatch user obtains dispatch service from the dispatch application server 120 in the home region (block 208).

The dispatch user then roams into the visited region (block 210). In response to the user roaming into the visited region, the subscriber unit 170 sends a re-registration request to the visited P-CSCF device 132, which, in turn, forwards the re-registration request to the home S-CSCF device 116 via the I-CSCF device 114 (as shown in the dashed line from the P-CSCF 132 to the I-CSCF 114) (block 212). The home S-CSCF device 116, after authenticating the re-registration request by querying the HSS 118, sends a notification including address, location, and/or location domain (in this case, of the visited network) of the subscriber unit 170 to the event notification server 160, which, in turn, looks up the appropriate dispatch application server (DAS) 140 and sends an assignment to it based on the location domain, location, and/or address information from the subscriber unit 170 (block 214). The dispatch user obtains dispatch service from the dispatch application server (DAS) 140 in the visited region (block 216). The event notification server 140 then sends a notification to cancel the prior assignment to the dispatch application server (DAS) 120 of the home region (block 218).

Figure 3:
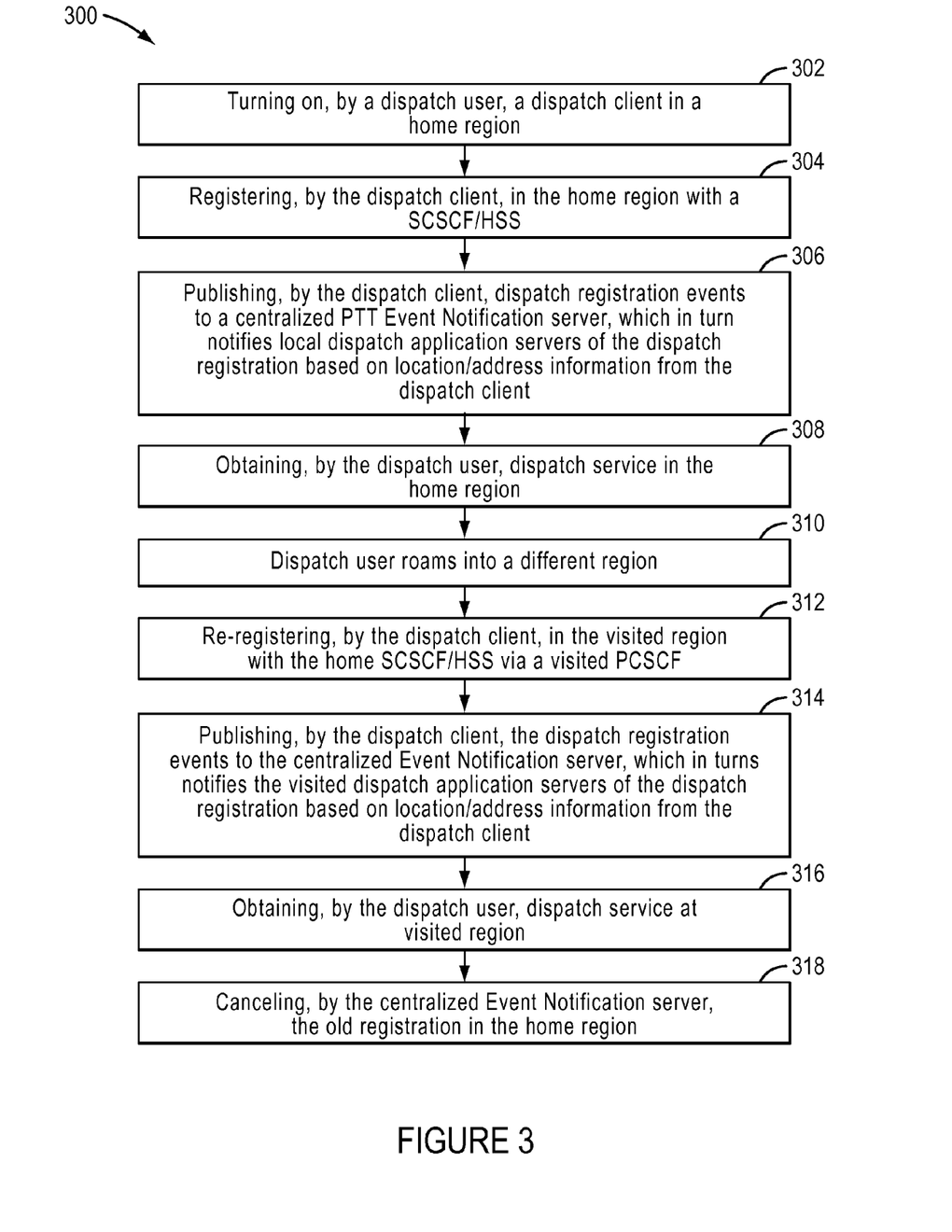
FIG. 3 illustrates another exemplary method of assigning a local dispatch application server for providing services to a subscriber unit in accordance with another embodiment of the invention.

FIG. 3 illustrates another exemplary method 300 of assigning a local dispatch application server for providing services to a registering subscriber unit in accordance with another embodiment of the invention. Similar to the prior example, the user of the subscriber unit 170 is initially in its home region, which is serviced by the first IMS core 110. Then, the user of the subscriber unit 170 roams to the visited region, which is serviced by the second IMS core 130.

According to the method 300, the user turns on the subscriber unit 170 in the home region (block 302). In response to being turned on, the subscriber unit 170 sends a registration request to the S-CSCF device 116 via the RAN 130, P-CSCF device 112, and the I-CSCF device 114 (block 304). After the S-CSCF device 116 has authenticated the subscriber unit 170 by querying the HSS 118, and sending a registration confirmation back to the subscriber unit 170, the subscriber unit 170 collects the address, location and/or location domain information and then publishes the information to the event notification server 160, which, in turn, looks up the appropriate dispatch application server (DAS) 120 based on such information, and notifies the DAS 120 of its assignment to provide services to the subscriber unit 170 (block 306). The dispatch user then obtains dispatch service from the dispatch application server (DAS) 120 in the home region (block 308).

The dispatch user roams into the visited region (block 310). In response to the user roaming into the visited region, the subscriber unit 170 sends a re-registration request to the home S-CSCF device 116 via the visited P-CSCF device 132 and the home I-CSCF device 114 (block 312). After the S-CSCF device 116 has authenticated the subscriber unit 170 by querying the HSS 118, and sending a registration confirmation back to the subscriber unit 170, the subscriber unit 170 collects the address, location and/or location domain information and publishes the information to the event notification server 160, which, in turn, looks up the dispatch application server (DAS) 140 based on such information, and notifies the DAS 140 of its assignment to provide services to the subscriber unit 170 (block 314). The dispatch user obtains dispatch service at visited region (block 316). Finally, the event notification server 160 sends a cancellation notification to the previously-assigned dispatch application server (DAS) 120 at the home region (block 318).

The scenario described above also occurs when a dispatch client visits a foreign carrier (the interface between the home and foreign carrier's dispatch event notification servers are by a secured link).

Figure 4A:
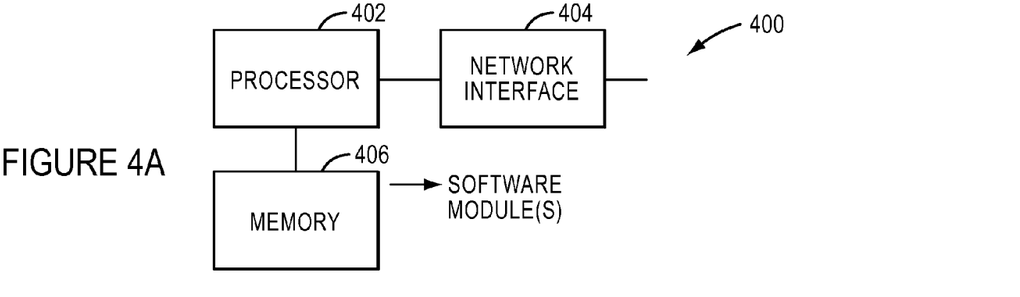
FIG. 4A illustrates a block diagram of an exemplary notification server in accordance with another embodiment of the invention.

FIG. 4A illustrates a block diagram of an exemplary event notification server 400 in accordance with another embodiment of the invention. The event notification server 400 comprises a processor 402, a network interface 404 coupled to the processor 402, and a memory 406 coupled to the processor 402. The processor 402 performs the various operations of the event notification server 400 as discussed below. The network interface 404 serves as an interface to a communications network to transmit communications thereto and receive communications therefrom. The memory 406, serving generally as a computer readable medium, stores one or more software modules adapted to control the processor 402 perform its intended operations.

Figure 4B:
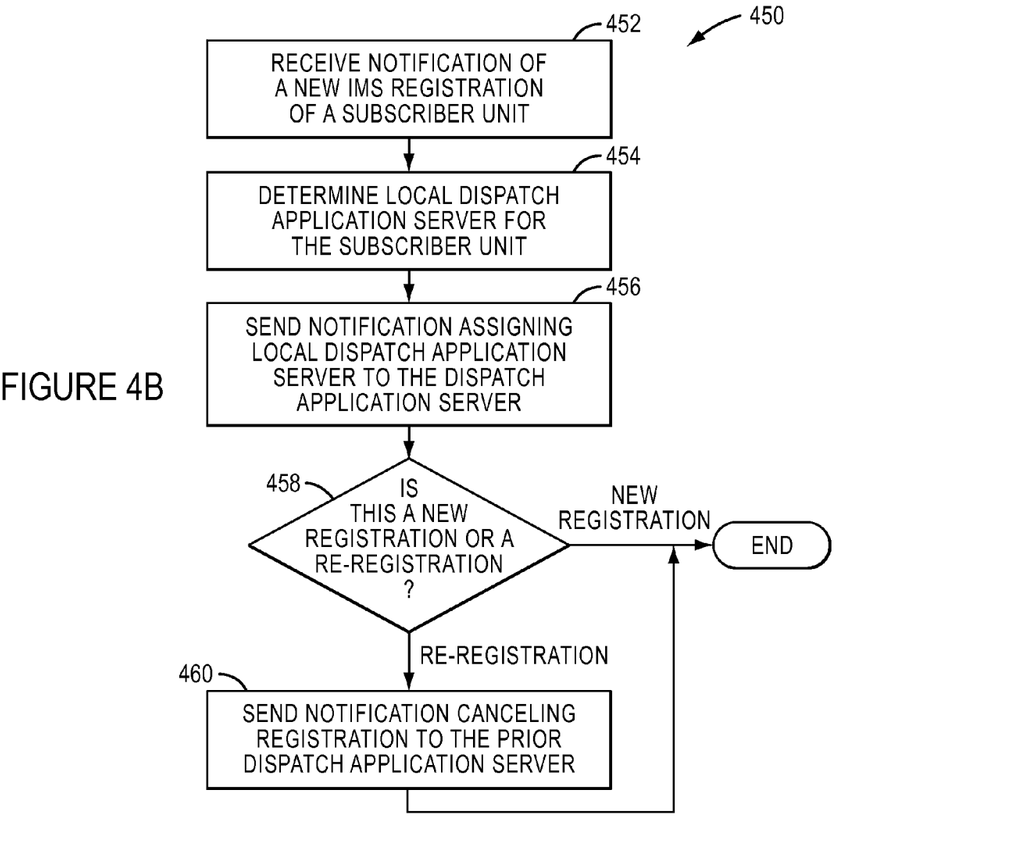
FIG. 4B illustrates a block diagram of an exemplary method of assigning a local dispatch application server to provide services to a subscriber unit in accordance with another embodiment of the invention.

FIG. 4B illustrates a block diagram of an exemplary method 450 of assigning a local dispatch application server to provide services to a subscriber unit in accordance with another embodiment of the invention. According to the method 450, the processor 402 receives a notification of an IMS registration (which includes a new registration or a re-registration) of a subscriber unit via the network interface 404 (block 452). The IMS registration notification may be received from the S-CSCF device of the home region of the subscriber unit. Alternatively, the IMS registration notification may be received from the subscriber unit itself. The IMS registration notification includes location domain, address, and/or location information associated with the subscriber unit.

Based on the received IMS registration notification including the location domain, address, and/or location information associated with the subscriber unit, the processor 402 determines which dispatch application server (DAS) is best suited to handle services for the subscriber unit by looking up the dispatch application server associated with the location domain, address, and/or location information of the subscriber unit (block 454). The processor 402 then sends an assignment notification to the selected dispatch application server (DAS) via the network interface 404 to provide services to the subscriber unit (block 456). The processor 402 also determines whether this is a new registration or a re-registration (block 458). If it is a new registration, the method 450 may be complete and ends. If it is a re-registration, the processor 402 sends a notification cancelling the registration (i.e., assignment) of the previously-assigned dispatch application server (DAS) (block 460). Thereafter, the method 450 may be complete and ends.

Figure 5A:
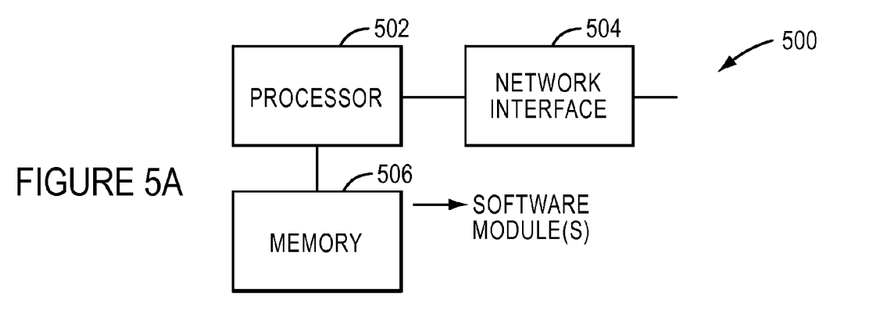
FIG. 5A illustrates a block diagram of an exemplary event notification server in accordance with another embodiment of the invention.

FIG. 5A illustrates a block diagram of an exemplary S-CSCF device 500 in accordance with another embodiment of the invention. The S-CSCF device 500 comprises a processor 502, a network interface 504 coupled to the processor 502, and a memory 506 coupled to the processor 502. The processor 502 performs the various operations of the S-CSCF 500 as discussed below. The network interface 504 serves as an interface to a communications network to transmit communications thereto and receive communications therefrom. The memory 506, serving generally as a computer readable medium, stores one or more software modules adapted to control the processor 502 perform its intended operations.

Figure 5B:
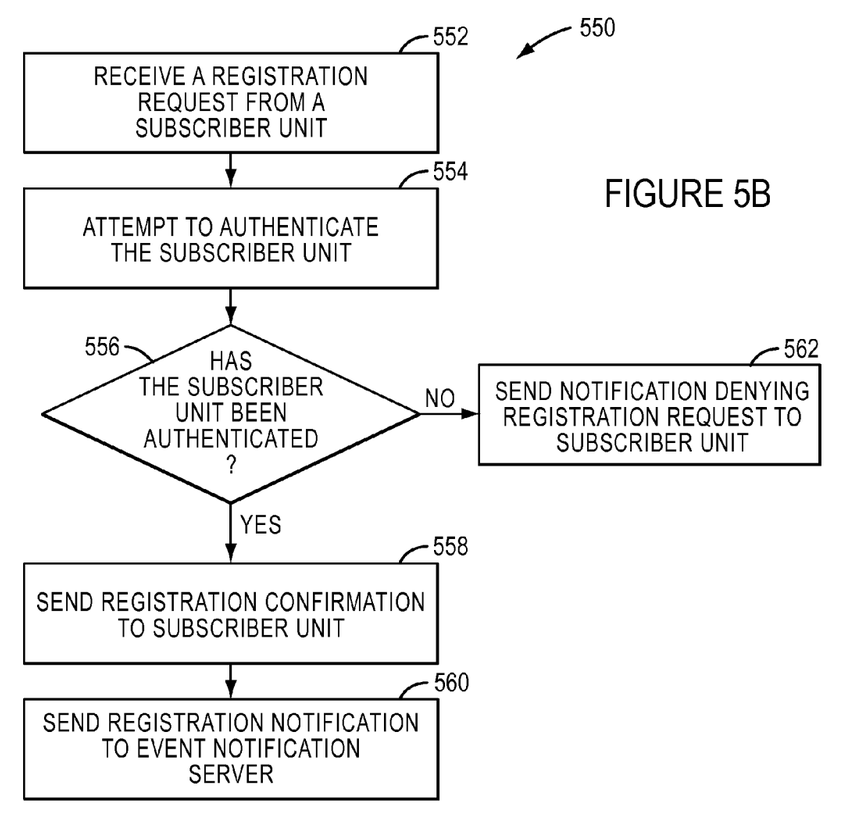
FIG. 5B illustrates a block diagram of an exemplary method of assigning a local dispatch application server to provide services to a subscriber unit in accordance with the present invention.

FIG. 5B illustrates a block diagram of an exemplary method 550 of assigning a local dispatch application server (DAS) to provide services to a subscriber unit in accordance with another embodiment of the invention. According to the method 550, the processor 502 receives an IMS registration request from a subscriber unit by way of the network interface 504 (block 552). In response to the registration request, the processor 502 attempts to authenticate the subscriber unit (block 554). If the processor 502 determines that the subscriber unit is not authenticated (block 556), the processor 502 sends a notification denying the registration request to the subscriber unit via the network interface 504 (block 562).

If the processor 502 determines that the subscriber unit is authenticated (block 556), the processor 502 sends a registration confirmation to the subscriber unit via the network interface 504 (block 558). The processor 502 then sends a registration notification to the event notification server via the network interface 504 (block 560). The registration notification includes location domain and possibly additional information (e.g., security key) pertaining to the subscriber unit. If the processor 502 may determine the location domain of the subscriber unit if it does not receive that information via the IMS registration request. The event notification server, in turn, uses the registration information to look up and notify the appropriate dispatch application server of its assignment to provide services to the subscriber unit.

Figure 6A:
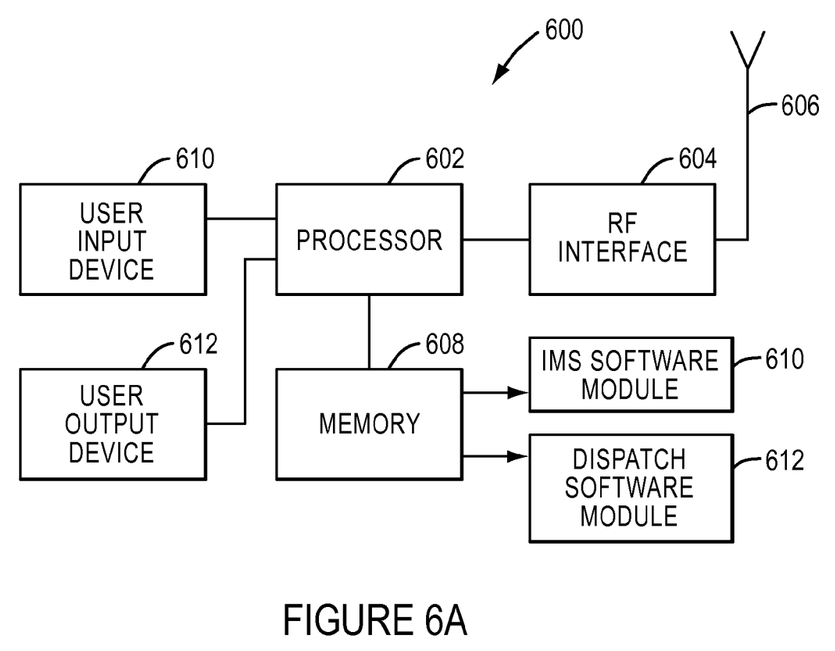
FIG. 6A illustrates a block diagram of an exemplary subscriber unit in accordance with another embodiment of the invention.

FIG. 6A illustrates a block diagram of an exemplary subscriber unit 600 in accordance with another embodiment of the invention. The subscriber unit 600 comprises a processor 602, a radio frequency (RF) interface 604 coupled to the processor 602, a memory 606 coupled to the processor 602, a user input device 610 coupled to the processor 602, and a user output device 612 coupled to the processor 602. The processor 602 performs the various operations of the subscriber unit 600 as discussed below. The RF interface 604 including the antenna 606 serve as an interface to the wireless medium for transmitting and receiving communications to and from the IMS network. It shall be understood that if the subscriber unit is coupled to the IMS network via a wired network (as in the case of a dispatch-to-desktop device), the RF interface 604 and antenna 606 are replaced with a network interface.

The memory 606, serving generally as a computer readable medium, stores an IMS software module 610 and a dispatch software module 612 adapted to control the processor 602 perform its intended operations. The user input device 610 (e.g., a keyboard, touch-sensitive display, pointing device) allows a user to send instructions and information to the processor 602. The user output device 612 (e.g., a display, speaker, vibrating unit) allows the processor to send instructions and information to the user.

Figure 6B:
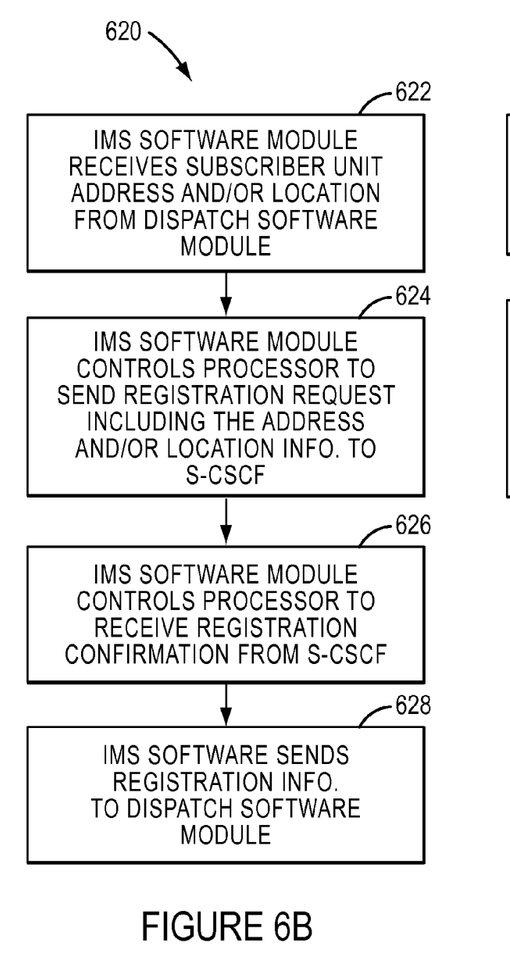
FIG. 6B illustrates a block diagram of another exemplary method of assigning a local dispatch application to provide services to a subscriber unit in accordance with another embodiment of the invention.

FIG. 6B illustrates a block diagram of an exemplary method 620 of notifying a local dispatch application server (DAS) of its assignment to provide services to the subscriber unit 600 in accordance with another embodiment of the invention. According to the method 650, the IMS software module 610 receives information related to the address, location and/or location domain of the subscriber unit 600 from the dispatch software module 612 (block 622). This may be in response to the commencing of a registration or re-registration process. The IMS software module 610 then controls the processor 602 to send a registration request (includes re-registration) including the address and/or location of the subscriber unit 600 to the home S-CSCF device via the RF interface 604 and the antenna 606 (block 624). In the registration process, the S-CSCF device sends the address, location, and/or location domain information to the event notification server for the purpose of assigning a dispatch application server to the subscriber unit. Thereafter, the IMS software module controls the processor 602 to receive a registration confirmation from the home S-CSCF device via the antenna 606 and RF interface 604 (block 626). The IMS software module 610 sends registration information to the dispatch software module 612 (block 628).

Figure 6C:
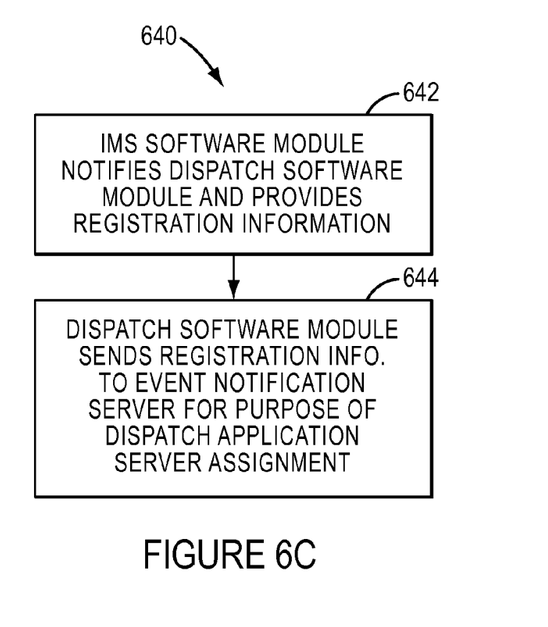
FIG. 6C illustrates a block diagram of another exemplary method of assigning a local dispatch application to provide services to a subscriber unit in accordance with another embodiment of the invention.

FIG. 6C illustrates a block diagram of another exemplary method 640 of assigning a local dispatch application to provide services to a subscriber unit in accordance with another embodiment of the invention. In this case, the IMS software module 610 performs and completes an IMS registration with the IMS network. Then, the IMS software module 610 notifies the dispatch software module 612 of the registration (block 642). In response, the dispatch software module 612 controls the processor to send the registration information to the event notification server (block 644). Such registration information includes the address, location, and/or location domain information associated with the subscriber unit 600.

In summary, the dispatch client is integrated with an IMS client for the IMS registration. The dispatch event notification network element supports notifications of the dispatch registration events from the S-CSCF to the local dispatch application servers (DAS). The event notification server cancels the old dispatch registration for the local dispatch application servers. The event notification server should be a highly scalable network element with secured interface to external network. Although exemplary embodiments of the present invention have been described in connection with Qualcomm's QChat dispatch network, the present invention can be used with any type of dispatch network.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A communications network, comprising:
 a plurality of dispatch application servers (DAS);
 a serving call session control function (S-CSCF) device located in a first IP multimedia subsystem (IMS) core, the S-CSCF device adapted to:
 receive an IMS registration request from a subscriber unit;
 authenticate said IMS registration request;
 send an IMS registration confirmation to said subscriber unit; and send a notification indicating said IMS registration to an event notification server; and an event notification server coupled to the S-CSCF device, coupled to another S-CSCF device located in a second IMS core, and coupled to the plurality of dispatch application servers, the event notification server adapted to:

receive said registration notification from said S-CSCF device;

select from among one of said plurality of dispatch application servers (DAS) a first DAS associated with the first IMS core or a second DAS associated with the second IMS core based on information related to the location domain, location and address associated with said subscriber unit in said registration notification; and send an assignment notification to said selected dispatch application server (DAS) indicating an assignment to provide dispatch service to said subscriber unit;

wherein said event notification server is adapted to use a look up table to determine said selected dispatch application server based on said location domain, location and address information.

2. The communications network of claim 1, wherein said S-CSCF device is situated in a home region of said subscriber unit.

3. The communications network of claim 2, wherein said S-CSCF device is adapted to receive said IMS registration request by way of an interrogating call session control function (I-CSCF) device and a proxy call session control function (P-CSCF) device.

4. The communications network of claim 3, wherein said I-CSCF and P-CSCF devices are situated in said home region of said subscriber unit.

5. The communications network of claim 1, further comprising a home subscriber server (HSS), and wherein said S-CSCF device is adapted to authenticate said subscriber unit by querying said HSS.

6. The communications network of claim 1, wherein said S-CSCF device is adapted to determine said location domain of said subscriber unit if location domain is not received via said IMS registration request.

7. The communications network of claim 1, wherein said S-CSCF device is further adapted to:

receive a re-registration request from said subscriber unit; authenticate said re-registration request; and send a notification indicating said re-registration of said subscriber unit to said event notification server.

8. The communications network of claim 7, wherein said S-CSCF device is adapted to receive said IMS registration request by way of an interrogating call session control function (I-CSCF) device and a proxy call session control function (P-CSCF) device.

9. The communications network of claim 8, wherein said I-CSCF device is situated in said home region and said P-CSCF device is situated in a visited or foreign region of said subscriber unit.

10. The communications network of claim 7, wherein said event notification server is further adapted to:

receive said re-registration notification from said S-CSCF device;

select another of said first or second dispatch application servers (DAS) based on information in said re-registration notification; and send a notification to said newly selected dispatch application server (DAS) indicating a new assignment to provide dispatch service to said subscriber unit.

11. The communications network of claim 10, wherein said event notification server is further adapted to send a cancellation notification to said previously-selected dispatch application server (DAS) cancelling its assignment to provide dispatch service to said subscriber unit.

12. A communications network, comprising;

a plurality of dispatch application servers (DAS);

a serving call session control function (S-CSCF) device located in a first IP multimedia subsystem (IMS) core, the S-CSCF device adapted to:

receive an IMS registration request from a subscriber unit;

authenticate said IMS registration request; and send an IMS registration confirmation to said subscriber unit; and an event notification server coupled to the S-CSCF device, coupled to another S-CSCF device located in a second IMS core, and coupled to the plurality of dispatch application servers, the event notification server adapted to:

receive a registration notification indicating said IMS registration from said subscriber unit;

select from among said plurality of dispatch application servers (DAS) a first DAS associated with the first IMS core and a second DAS associated with the second IMS core based on information related to the location domain, location and address associated with said subscriber unit in said registration notification; and send an assignment notification to said selected dispatch application server (DAS) indicating an assignment to provide dispatch service to said subscriber unit;

wherein said event notification server is adapted to use a look up table to determine said selected dispatch application server based on said location domain, location and address information.

13. The communications network of claim 12, wherein said S-CSCF device is further adapted to:

receive a re-registration request from said subscriber unit; authenticate said re-registration request; and send a notification confirming said re-registration to said subscriber unit.

14. The communications network of claim 13, wherein said event notification server is further adapted to:

receive a re-registration notification indicating said re-registration from said subscriber unit;

select another of said first or second dispatch application servers (DAS) based on information in said re-registration notification; and send an assignment notification to said newly selected dispatch application server (DAS) indicating a new assignment to provide dispatch service to said subscriber unit.

15. The communications network of claim 14, wherein said event notification server is further adapted to send a cancellation notification to said previously-selected dispatch application server (DAS) cancelling its assignment to provide dispatch service to said subscriber unit.

16. An event notification server adapted to interface with an IP multimedia subsystem (IMS) network, comprising:

a network interface; and a processor adapted to:

receive a notification of a registration or re-registration of a subscriber unit via said network interface;

select a first dispatch application server (DAS) associated with a first IMS core or a second DAS associated with a second IMS core from among a plurality of dispatch application servers based on information related to the location domain, location and address associated with said subscriber unit in said registration or re-registration notification, and send an assignment notification to said selected first or second dispatch application server (DAS) via said network interface, indicating an assignment to provide dispatch service to said subscriber unit;

wherein the event notification server is coupled to a serving call session control function (S-CSCF) device located in the first IMS core, coupled to another S-CSCF device located in the second IMS core, and coupled to the plurality of dispatch application servers;

wherein said event notification server is adapted to use a look up table to determine said selected dispatch application server based on said location domain, location and address information.

17. The event notification server of claim 16, wherein said processor is further adapted to send an assignment cancellation notification to a previously selected dispatch application server if said notification received from said S-CSCF device indicates a re-registration of said subscriber unit.

18. The event notification server of claim 16, wherein said processor is adapted to receive said registration or re-registration notification from said subscriber unit.

19. The event notification server of claim 16, wherein said processor is adapted to receive registration or re-registration notification from the S-CSCF device.

20. A serving call session control function (S-CSCF) device located in a first IP multimedia subsystem (IMS) core, comprising:

a network interface; and
a processor adapted to:
receive an IMS registration or re-registration request from a subscriber unit; authenticate said IMS registration or re-registration request; and
send a notification indicating said registration or re-registration of said subscriber unit to an event notification server, wherein said notification comprises information related to the location domain, location and address associated with said subscriber unit from which said event notification server is to assign a first dispatch application server associated with the first IMS core or a second dispatch application server associated with a second IMS core to provide dispatch service to said subscriber unit, wherein the S-CSCF device is coupled to the event notification server which is coupled to another S-CSCF device located in the second IMS core and to a plurality of dispatch application servers;

wherein said event notification server is adapted to use a look up table to determine said selected dispatch application server based on said location domain, location and address information.

21. The S-CSCF device of claim 20, wherein said processor is adapted to determine said location domain information if said location domain information is not in said IMS registration or re-registration request.

* * * * *